United States Patent [19]

Daniels

[11] Patent Number: 4,832,475
[45] Date of Patent: May 23, 1989

[54] NON-FOGGING SHOWER MIRROR

[76] Inventor: John J. Daniels, 107 Columbine Dr., Trumbull, Conn. 06611

[21] Appl. No.: 147,933

[22] Filed: Jan. 25, 1988

[51] Int. Cl.⁴ ............................................. G02B 7/18
[52] U.S. Cl. .................................... 350/588; 248/467
[58] Field of Search ....................... 350/588, 582, 584; 248/467

[56] References Cited

U.S. PATENT DOCUMENTS

| D. 280,574 | 9/1985 | Kladitis | 350/588 |
| 3,708,218 | 11/1973 | Smillie, III | 350/588 |
| 4,150,869 | 4/1979 | Hansen | 350/588 |
| 4,327,961 | 5/1982 | Kladitis | 350/588 |
| 4,655,559 | 4/1987 | Odell | 350/588 |

*Primary Examiner*—Jon W. Henry
*Attorney, Agent, or Firm*—Handal & Morofsky

[57] ABSTRACT

A conventional mirror will quickly fog when exposed to the extremely humid environment of the shower. This is because the moisture contained in the warm ambient air condenses on the relatively cooler mirror surface. An effective way to remedy this problem is to heat the mirror surface to a sufficient temperature to combat condensation of the moisture in the ambient air. This invention provides an effective method and apparatus to combat fog formation. This invention utilizes relatively simple construction to provide a low cost, safe, highly portable, efficient and effective method and apparatus to provide a non fogging shower mirror. To achieve this, the inventive device (10) incorporates a mirror, attached to a reservoir (14). This reservoir (14) holds a thermal mass of warm water. The thermal energy of this warm water is conducted through the mirror (12) substrate to the mirror surface, thus raising the temperature of the mirror (12) surface sufficiently to effectively combat moisture condensation and thus combat fog formation. The reservoir (14) includes a filling orifice (18), suspension hook hole (16) and water exit port (20). The user fills the inventive device (10) with water through the filling orifice (18) and hangs the inventive device (10) by a hook secured to the shower wall and inserted in suspension hook hole (16). The water in the reservoir (14) slowly escapes through the action of gravity through water exit port (20), thus leaving an empty reservoir.

11 Claims, 3 Drawing Sheets

NON-FOGGING SHOWER MIRROR

TECHNICAL FIELD

The invention relates to a method and apparatus for providing a fog free reflective surface for mirrors. In particular, for providing a fog free mirror for use in the shower.

BACKGROUND OF THE INVENTION

This invention has been filed in the Patent and Trademark Office under the Disclosure Document Program and has been assigned No. 167576.

As anyone who has ever attempted to shave while showering would attest to, it is difficult to attain a clean, consistent shave simply by going on feel. One can bring a conventional mirror into the shower, but the mirror will quickly become clouded due to the moisture in the warm air condensing on the relatively cool mirror surface. In addition, the glass substrate construction of conventional mirrors poses a potential hazard to the user should the mirrors fall and break into sharp pieces which are easily injure bare feet.

There have been a variety of attempts to devise devices that combat the condensative properties of a cool mirror surface in the excessively humid shower environment. These devices attempt to combat fog forming on a mirror through the use of; coatings on the mirror surface, direction of a flow of air across the mirror surface, electric heating elements to heat the mirror surface, electric bulbs to heat the mirror surface or the redirection of hot water from the bathroom pipes to flow through a heat exchanger and heat the mirror surface. It is self evident that all of these systems have limited practicality because of expense, non-reliability, safety hazards, difficulty of maintenance, and/or difficulty of construction and/or installation.

As mentioned above, attempted methods for combating fog formation include utilizing the flow of heated water diverted from bathroom pipes. This concept is shown in both Gottlieb, U.S. Pat. No. 4,556,298 and Stephens, U.S. Pat. No. 4,558,929. The use of both of these systems involves the altering of existing shower components and in addition to the expense involved in construction and installation of such systems, these systems become either permanent fixtures or at least relatively difficult to move or even reposition in the shower.

DISCLOSURE OF THE INVENTION

The invention as claimed is intended to provide a remedy. It solves the problem of how to combat fog formation on a reflective surface in an excessively humid environment while maintaining simple construction, low cost, reliability, portability, safety and high effectiveness.

A conventional mirror will quickly fog if exposed to the excessive humidity of the shower environment. This is due to the moisture in the warm air condensing on the relatively cool mirror surface. In accordance with the invention, fog formation is combated by heating the mirror surface to at least the same temperature as the surrounding air. This inventive system utilizes a reservoir having back and sidewalls constructed of plastic or any suitable material and having its front wall comprising a mirror. Preferably this mirror is constructed of a plastic substrate. The top of the reservoir has a suitable opening to allow the user to fill the reservoir with warm water. This warm water is held in the reservoir and its thermal energy is conducted through the mirror substrate to the mirror surface, thus effectively heating the mirror surface to such a temperature that condensation of the moisture in the ambient air is impossible on the mirror surface. Thus the inventive system effectively provides a fog free shower mirror. In accordance with the preferred embodiment, the inventive device can include a small diameter hole or exit port located at the bottom of the reservoir. The water in the reservoir slowly leaks out after filling and thereby the user has only to fill the reservoir at the beginning of the shower and not have to empty it at the end. Because the mirror and the reservoir can be made entirely out of plastic, there is no danger of the mirror ever shattering and producing sharp fragments that may injure the user. The inventive device is completely self contained and its size determined by the desired size of the mirror and is completely portable. Likewise the inventive device can be constructed of relatively light weight materials, and the volume of the reservoir is relatively small, and it thus may be hung in the shower on suction cups or other suitable device.

From the above recited features and other advantageous characteristics intrinsic to the inventive device, it will be appreciated that the present invention provides substantial improvements over earlier designs. The inventive device utilizes simple construction while being a safe, effective, portable and easy to use apparatus for providing a fog free reflective surface of a shower mirror.

The inventive device can utilize many methods of construction to achieve the desired positioning of the invention in the shower. One of the simplest methods is to include a hook or a hole into which a hook sits to suspend the inventive device from a suction cup or other fixture attached to the wall of the shower. A permanent or semi-permanent holder can be affixed to the shower wall and the inventive device can be easily removed, filled with warm water and replaced. Such a holder can incorporate devices 100 for holding razors, toothbrush, etc. The inventive device itself can be permanently or semi-permanently affixed to the shower wall and a suitable device, such as a cup or a hose leading from the showerhead, can be used to fill the reservoir.

The hole at or near the bottom of the inventive device through which the water exits can have a plug or a valve to retain the warm water to increase the duration of the fog combative effect of the inventive device.

The inventive device can efficiently function using a variety of reservoir, mirror, filling orifice and exit port dimensions. The mirror can also be either concave or convex to produce various magnifying powers. The mirror surface can also incorporate coatings to enhance its non-fogging capabilities as well as increase its durability.

DETAILED DESCRIPTION OF THE DRAWINGS

Figure 1:
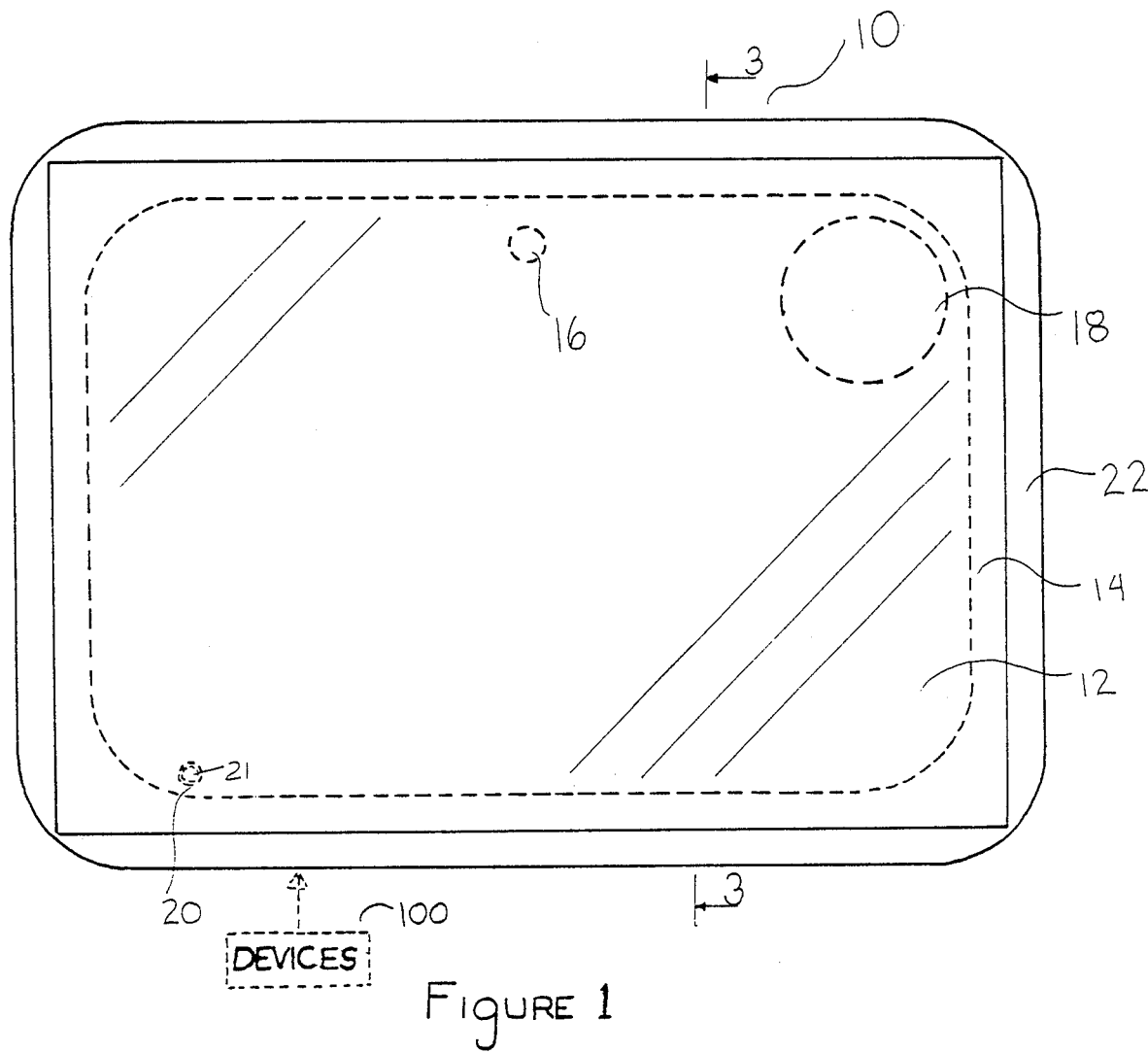
FIG. 1 is a front view of the inventive device.

FIG. 1 is a front view of the inventive device 10. The mirror 12 is attached to the reservoir 14. The user fills the reservoir 14 with warm water through the filling orifice 18 located at or near the top of the reservoir 14. The back surface of the mirror 12 is exposed, either by direct contact or through some conductive medium, to the warm water within the reservoir 14. The thermal energy of the water is conducted through the mirror substrate and to the mirror 12 front surface. Thus the front surface of the mirror 12, which is exposed to the humid extremes of the shower environment, is heated to such a temperature as to effectively combat fog formation. Water exit hole 20 is located at or near the bottom of the reservoir 14 and allows the water contained in the reservoir 14 to slowly leak out and empty the reservoir 14. Plug or valve 21 can be inserted into water exit hole 16 to increase the duration of the flow of water out of the reservoir 14. Suspension hook hole 16 allows the inventive device to be positioned on the shower wall by a hook or other suitable device attached to the shower wall. The preferred embodiment of the invention includes a flange 22 bordering the reservoir.

Figure 2:
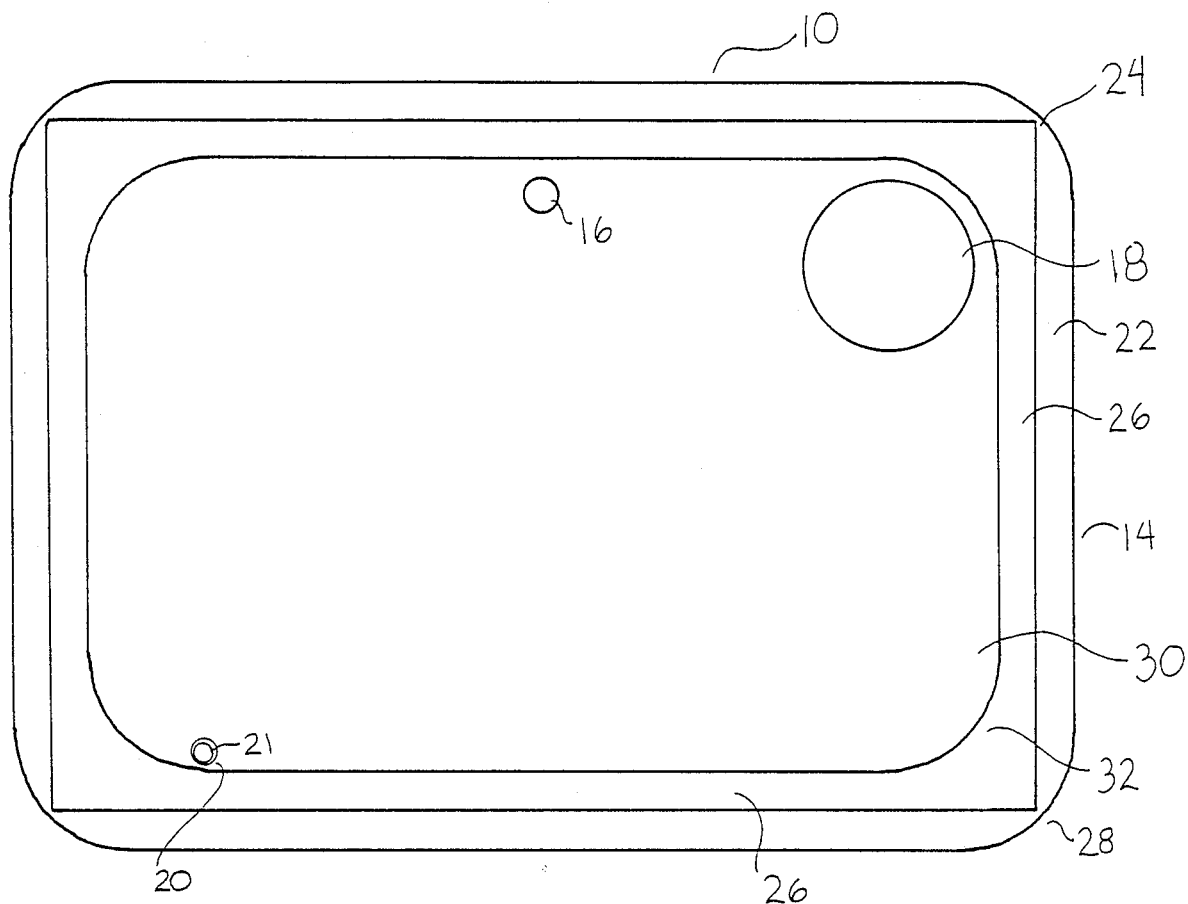
FIG. 2 is a back view of the inventive device.

FIG. 2 is a back view of the inventive device. In the preferred embodiment of the invention, the mirror seat 26 of the reservoir is formed with square corners 24. This allows for cost efficient use of square cut mirrors. In the preferred embodiment of the invention, the flange 22 has rounded corners 28 which add to the appearance and safety of the invention. In the preferred embodiment of the invention, the reservoir back wall 30 also has rounded corners 32. The position of the filling orifice 18 is necessarily located towards the top of the reservoir 14, however, the location and dimension of the filling orifice 18 can be varied. The water exit hole 20 is necessarily located toward the bottom of reservoir 14, however, the location and dimension of the water exit hole 20 can be varied or the water exit hole 20 may be omitted. Plug or valve 21 is inserted into water exit hole 21 to increase the duration of the flow of water out of the reservoir 14. It will be noted that a reservoir 14 relatively larger than the mirror 12 can be used to increase the thermal mass of the water. Or conversely, a larger mirror 12 can be used to increase the reflective surface area.

Figure 3:
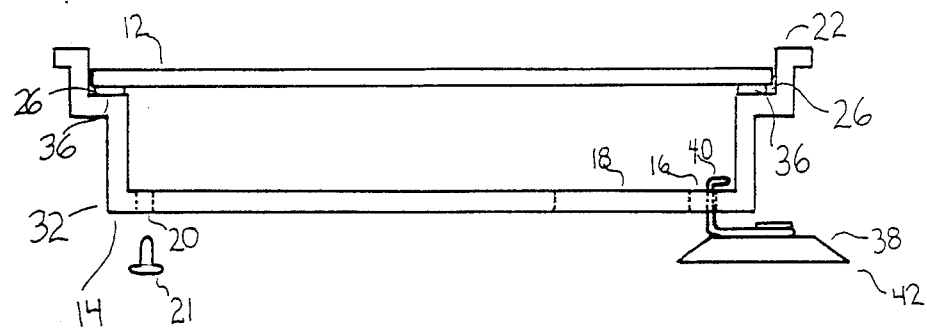
FIG. 3 is a cross sectional view of the inventive device along lines 3—3 of FIG. 1.

FIG. 3 is a cross section of the inventive device along lines 3—3 of FIG. 1. The mirror 12 fits into the reservoir and is secured to the mirror seat 26 of the reservoir. In the preferred embodiment of the invention this securing is achieved by glue bonding the mirror 12 to the mirror seat 26. Alternative methods can be utilized to secure the mirror to the reservoir. These methods include, but are not limited to; heat bonding, integrally forming the mirror with the reservoir, snap fitting the mirror to the reservoir and/or double sided tape adhering the mirror to the reservoir. In accordance with the preferred embodiment, the inventive device 10 can include a small diameter hole or exit port 20 located at the bottom of the reservoir 14. The water in the reservoir 14 slowly leaks out after filling and thereby the user has only to fill the reservoir 14 at the beginning of the shower and not have to empty it at the end. The inventive device 10 can utilize many methods of construction to achieve the desired positioning of the invention in the shower. One of the simplest methods is to include a hook or hole 16 into which a hook 40 sits to suspend the inventive device 10 from a suction cup 38 or other fixture attached to the wall of the shower. As noted above, the relative dimensions of the components of the inventive device can be modified depending on the material used and the application and desired characteristics of the inventive device.

Figure 4:
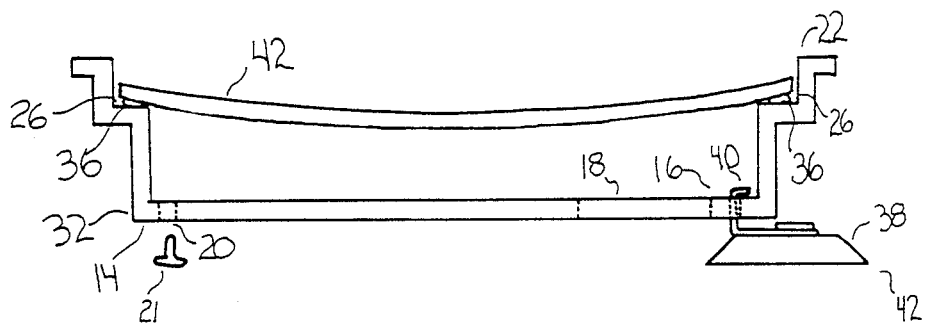
FIG. 4 is a cross sectional view similar to FIG. 3 of an alternative of the inventive system but with a concave mirror reflective member.

FIG. 4 is a cross section of an alternative embodiment of the inventive device. In this drawing the reflective member is a curved mirror 42.

While an illustrative embodiment of the invention has been described, it is of course understood that various modifications will be obvious to those of ordinary skill in the art. Such changes and modifications are within the scope of the invention which is limited and defined only by the appended claims.

I claim:

1. A non-fogging mirror, comprising:
    (a) a volume defining member for defining a volume for containing water;
    (b) a reflective member secured to said volume defining member, and together with said volume defining member forming a reservoir for holding water in thermal contact with said reservoir, said reflective member forming a front wall of said reservoir;
    (c) an orifice defined in the upper portion of said reservoir; and
    (d) an exit orifice defined in said reservoir positioned configured and dimensioned to slowly empty said non-fogging mirror of said water through the action of gravity.

2. A non-fogging mirror as in claim 1 comprising further:
    (e) hanging means positioned on said reservoir and configured and dimensioned to support said non-fogging mirror.

3. A non-fogging mirror as in claim 1 wherein said volume defining member is plastic.

4. A non-fogging mirror as in claim 1 wherein said reflective member is plastic.

5. A non-fogging mirror as in claim 2, further comprising a supporting member wherein said hanging means mates with a supporting member or members secured to a wall wherein said supporting member, comprises:
    (e) a suction cup; and
    (f) a hooking member secured to or integrally formed with said suction cup.

6. A non-fogging mirror as in claim 1 wherein emptying through said exit orifice is controlled by: a plug or a valve.

7. A non-fogging mirror as in claim 1 wherein said reservoir is attached to or integrally formed with means for supporting shaving or hygiene utensils or implements.

8. A non-fogging mirror as in claim 2 further comprising a separate supporting member wherein said hanging means engages with said separate supporting member secured to a wall.

9. A non-fogging mirror as in claim 1 wherein said reflective member is curved.

10. A non-fogging mirror, comprising:
    (a) a volume defining member for defining a volume for containing water;
    (b) a reflective member secured to said volume defining member, and together with said volume defining member forming a reservoir for holding water in thermal contact with said reservoir, said reflective member forming a front wall of said reservoir;

(c) an orifice defined in the upper portion of said reservoir dimensioned on same order of size as a shower head; and (d) an exit orifice defined in said reservoir positioned configured and dimensioned to slowly empty said non-fogging mirror through the action of gravity.

11. A non-fogging mirror, comprising:

(a) a volume defining member for defining a volume for containing water;

(b) a concave reflective member secured to said volume defining member, and together with said volume defining member forming a reservoir for holding water in thermal contact with said reservoir, said concave reflective member forming a front wall of said reservoir;

(c) an orifice defined in the upper portion of said reservoir dimensioned on same order of size as a shower head; and (d) an exit orifice defined in said reservoir positioned configured and dimensioned to slowly empty said non-fogging mirror through the action of gravity.

* * * * *